Oct. 11, 1966
G. BONETTI
3,277,712
LIQUID LEVEL INDICATOR
Original Filed Feb. 19, 1964
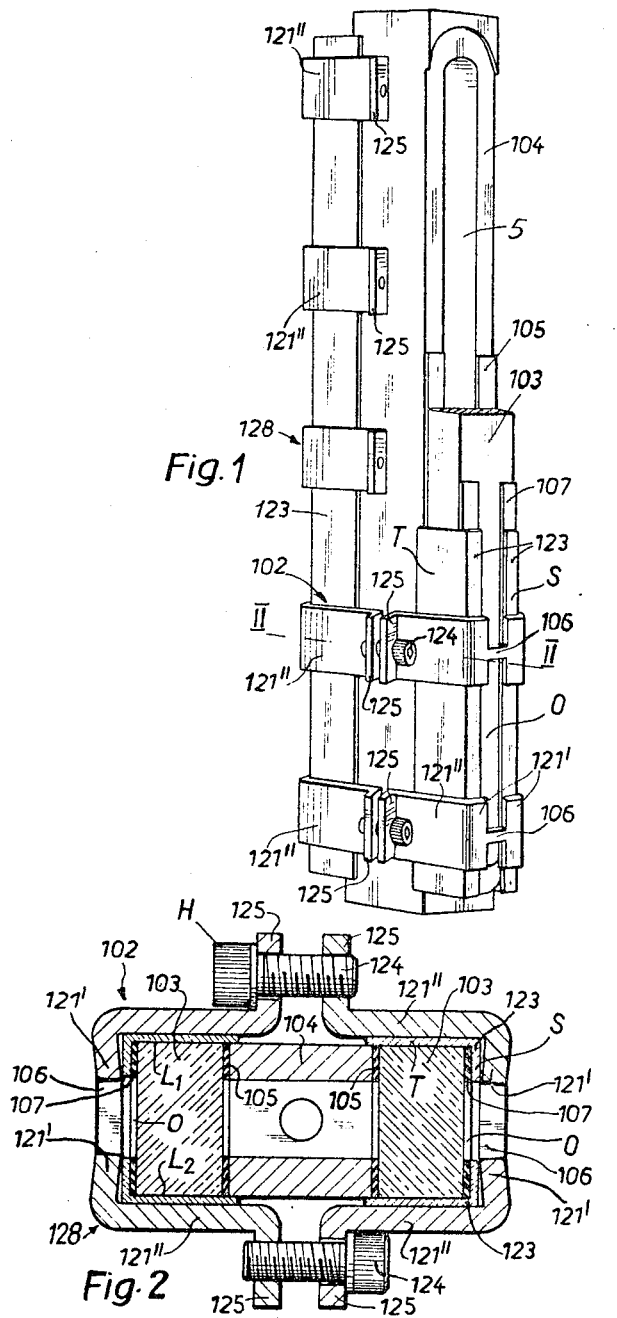

United States Patent Office 3,277,712
Patented Oct. 11, 1966

3,277,712
LIQUID LEVEL INDICATOR
Giulio Bonetti, Milan, Italy, assignor to Istag A.G.
Suhr/AG, Suhr, Aargau, Switzerland
Original application Feb. 19, 1964, Ser. No. 346,018, now Patent No. 3,221,552, dated Dec. 7, 1965. Divided and this application Aug. 2, 1965, Ser. No. 476,461
Claims priority, application Italy, Feb. 22, 1963, 3,777/63
6 Claims. (Cl. 73—330)

This application is a divisional application based on my earlier copending application Ser. No. 346,018 filed February 19, 1964, now Pat. No. 3,221,552.

The present invention relates to liquid level indicators such as are used, for example, in the steam and chemical industries for pressure tanks.

Such known indicators comprise at least two longitudinally abutting prismatic parts which together form an outwardly sealed liquid duct adapted to serve as an indicating means, and of which at least one part consists of transparent material, in order to render visible a liquid column in the duct. Conventionally, these prismatic indicator parts are locked together by means of a longitudinally extending casing or the like, which encloses the two elongated prismatic parts and presses them against each other while leaving free an observation slot.

It is an object of the invention to provide an indicator of the above type, which is of simple construction and can be produced without substantial expenditure, particularly for low operating pressures.

To achieve the above and other of its objectives, the invention contemplates, according to one embodiment thereof, the provision of a liquid level indicator comprising an elongated spacer provided with a continuous slot with two elongated prismatic elements being provided on opposite sides of the spacer. Packings may be provided between the spacer and elements, and the elements and spacer with the packings therebetween form a unit defining a sealed liquid duct constituting a visual indicator. Each of the elements has an observation surface bounded by two lateral surfaces, with soft protective strips marginally covering the observation surfaces, angle members including first and second sections respectively covering these strips and extending flatly along the lateral surfaces. The angle members extend past the packing onto the spacer, according to a preferred version of the invention. Moreover, a plurality of separate clamps are spaced along and encircle the unit, each clamp including lateral portions extending along the aforesaid lateral surfaces and end portions connected to the lateral portions at an acute angle and engaging against the first sections of the angle members at positions spaced inwardly of the lateral surfaces of the prismatic elements. The clamps each further include webs connecting the related end portions and of substantially lesser width than the same. Moreover, the clamps each include two separable sections, there being provided means which extend through the clamp sections to engage the same to hold the prismatic elements and spacer together.

The liquid level indicator according to the invention offers the advantage of eliminating the housings hitherto used for compressing the prismatic indicator parts, which housings had to be separately produced for each desired length of indicator. Moreover, the clamping members employed according to the invention can be easily produced and the same type of clamp can be used with any desired observation length, since for different desired lengths it is only necessary to select different numbers of clamps.

Preferably, one of the prismatic indicator parts consists of a glass plate or glass bar and the clamping members are so formed that the engaging point of each tightening clamp on the observation surface of the glass bar will be situated outside of the marginal zone of the bar, preferably at a distance of 7 to 9 mm. from the edge. In this manner the problem is avoided whereby the glass bar splinters off at the marginal portion thereof which defect otherwise may easily occur when a plurality of individual clamps are used which act on the edge of the glass bar. In this manner, moreover, the occurrence of forces is prevented, which tend to spread the clamp apart. Advantageously the correct position of the engaging points of the clamping members is obtained when each tightening clamp abuts against the observing glass surface at an acute angle which opens towards the marginal portion of the glass bar and preferably measures from 2 to 4 degrees.

In order to avoid local excess pressures at the point of attack of the clamping members an intermediate layer preferably is provided between the clamp and the observing glass surface. A particularly advantageous distribution of forces on the glass bar will be obtained when a continuous intermediate layer is provided for each longitudinal edge portion of the bar; when this layer is of angular shape, the associated lateral face of the glass plate will also be covered and thus protected.

The tensioning force, required for compressing the prismatic indicator parts by means of clamps, can be obtained by means of screws. The clamping members in that zone of the glass bar, where the liquid level is read, may be interconnected by a small web not impeding the observation of the level.

The present invention will now be described in more detail with reference to the accompanying drawing illustrating, by way of example, one preferred embodiment of the invention, and which FIGURE 1 is a perspective view of a transparent indicator having two glass plates, and FIGURE 2 is a sectional view along line II—II of FIG. 1.

The visual indicator in FIGURES 1 and 2 comprises two elongated glasses or prismatic elements 103 provided with smooth surfaces. These glasses are clamped, by means hereafter disclosed, together with a glass retainer or spacer member 104 and interposed packings 105.

The glass retainer 104 is provided with a continuous slot 5 and together with the two glasses 103 forms a sealed liquid duct in which a liquid column is visible when the front face of the glass is looked at.

Clamping is effected by a plurality of clamps 102 regularly spaced along the length of the indicator. Each clamp 102 consists of a pair of clamping members 128 bent in the form of a U, the opposite ends 125 of which are connected together by means of screws 124. The clamping members 128 are of identical construction, and a screw head H is directed towards each side of the indicator. The clamping members are also bent in such a manner that the ends or sections 121' and 121" form an angle of less than 90 degrees, thus relieving the glass edges from being acted upon by any clamp tensioning forces. Said ends engage about 7 to 9 millimeters inwardly of the glass edges so that risk of splintering is avoided.

The portion of the clamping members 128 traversing the reading zone of the two glasses 103 are formed as narrow webs 106 which do not obstruct the sight. Also, intermediate layers 123 are provided, which in cooperation with soft washers 107 insure a perfect and uniform pressure transmission onto the glasses.

More particularly, it will be noted that each of the prismatic elements 103 includes an observation surface O bounded by two lateral surfaces L1 and L2, with respect to which washers 107 constitute soft protective strips marginally covering the observation surface O.

In addition, it is to be noted that the angle members, or intermediate layers 123, each include a first section S which covers the strips or washers 107 and a second section T which extends flatly along the aforesaid lateral surfaces.

Preferably, the sections T of the angle members 123 extend past the packings 105 onto the lateral surfaces of the spacer 104.

In view of the above, it will now be appreciated that the liquid level indicator of the invention comprises an elongated spacer provided with a continuous slot with two elongated prismatic elements on opposite sides of the spacer, there being provided packings between the spacer and the prismatic elements.

It will be moreover appreciated that the prismatic elements and spacer form a unit defining a sealed liquid duct constituting a visual indicator.

Said prismatic elements each have an observation surface bounded by two lateral surfaces there being provided soft protective strips marginally covering the observation surface with angle members including first and second sections respectively covering the strips and extending flatly along the lateral surfaces.

It will be understood that in a preferred embodiment the angle members extend past the aforesaid packings onto the spacer.

Also to be understood from the above is that a plurality of separate clamps may be spaced along the unit encircling the same, each of these clamps including lateral portions which extend along the aforesaid lateral surfaces and end portions connected to the lateral portions at an acute angle and engaging the first sections of the angle members at a position spaced inwardly of the lateral surface of the prismatic element.

It will also be understood that the clamps each further include webs connecting the related end portions and being of a substantially lesser width than the same.

In addition, it will now be appreciated that the clamps each include two separable sections with means being provided for engaging the sections to hold the prismatic elements and spacer together.

It is obvious that when assemblying the liquid level indicator the number of clamps may be selected such that the liquid level indicator is able to withstand the desired operational conditions.

Therefore it is possible to adapt the liquid level indicator to any desired pressure conditions merely by selecting the proper number of clamps without any other further or additional means.

There will now be obvious to those skilled in the art many modifications and variations of the structure set forth above. These modifications and variations will not depart from the scope of the invention if defined by the following claims.

What is claimed is:

1. A liquid level indicator comprising an elongated spacer provided with a continuous slot, two elongated prismatic elements on opposite sides of said spacer, packings between said spacer and elements, said elements and spacer forming a unit defining a sealed liquid duct constituting a visual indicator, said elements each having an observation surface bounded by two lateral surfaces, soft protective strips marginally covering said observation surface, angle members including first and second sections respectively covering said strips and extending flatly along said lateral surfaces, said angle members extending past said packing onto said spacer, a plurality of separate clamps spaced along and encircling said unit, said clamps each including lateral portions extending along said lateral surfaces and end portions connected to the lateral portions at an acute angle and engaging against the first sections of the angle members at positions spaced inwardly of the lateral surfaces of said prismatic elements, said clamps each further including webs connecting the related end portions and of substantially lesser width than the same, said clamps each including two separable sections, and screws extending through and between the clamp sections and engaging the same to hold said elements and spacer together.

2. A liquid level indicator comprising an elongated spacer provided with a continuous slot, two elongated prismatic elements on opposite sides of said spacer, packings between said spacer and elements, said elements and spacer forming a unit defining a sealed liquid duct constituting a visual indicator, said elements each having an observation surface bounded by two lateral surfaces, soft protective strips marginally covering said observation surface, angle members including first and second sections respectively covering said strips and extending flatly along said lateral surfaces, said angle members extending past said packing onto said spacer, a plurality of separate clamps spaced along and encircling said unit, said clamps each including lateral portions extending along said lateral surfaces and end portions connected to the lateral portions at an acute angle and engaging against the first sections of the angle members at positions spaced inwardly of the lateral surfaces of said prismatic element, said clamps each further including webs connecting the related end portions and of substantially lesser width than the same; said clamps each consisting of at least two separable sections, and means for engaging the said sections to hold said elements and spacer together.

3. A liquid level indicator comprising an elongated spacer provided with a continuous slot, two elongated prismatic elements on opposite sides of said spacer, packings between said spacer and elements, said elements and spacer forming a unit defining a sealed liquid duct constituting a visual indicator, said elements each having an observation surface bounded by two lateral surfaces, soft protective strips marginally covering said observation surface, angle members including first and second sections respectively covering said strips and extending flatly along said lateral surfaces, a plurality of separate clamps spaced along and encircling said unit, said clamps each including lateral portions extending along said lateral surfaces and end portions connected to the lateral portions at an acute angle and engaging against the first sections of the angle members at positions spaced inwardly of the lateral surfaces of said prismatic elements, said clamps each further including a web connecting the related end portions and of substantially lesser width than the same; said clamps each including two separable sections, and means for engaging said sections to hold said elements and spacer together.

4. An indicator as claimed in claim 3 wherein said end portions engage inwardly of said lateral surfaces by about 7–9 millimeters.

5. An indicator as claimed in claim 3 wherein the clamp sections are identical and include facing flanges engaged by said means.

6. An indicator as claimed in claim 3 wherein the prismatic elements are of identical rectangular cross-section.

References Cited by the Examiner
UNITED STATES PATENTS

| | | | |
|---|---|---|---|
| 1,126,226 | 1/1915 | Kassander | 73—330 |
| 1,676,026 | 3/1927 | Hartmann et al. | 73—330 |
| 2,882,730 | 4/1959 | Yarnall | 73—331 |

LOUIS R. PRINCE, *Primary Examiner.*